Fig. 1

INVENTOR.
CARL W. MULLIS, SR
BY
Ralph Burch
ATTORNEY

United States Patent Office 2,908,302
Patented Oct. 13, 1959

2,908,302

ROTARY DEBARKER HAVING PIVOTABLE BARK-REMOVING TOOLS BIASED BY FLUID UNDER PRESSURE IN AN ANNULAR TANK

Carl W. Mullis, Sr., Lancaster, S.C.

Application July 15, 1957, Serial No. 671,747

10 Claims. (Cl. 144—208)

This invention appertains to improvements in apparatus for removing bark from logs and particularly relates to a novel and improved log-skinning apparatus.

A primary object of the present invention is to provide an automatic log-skinning machine, which efficiently, inexpensively and without hazard to the operators will skin the bark from all species of logs regardless of the diameter and shape thereof and the presence of hollows, ridges, knots or the like deformities in the logs.

Another important object of the present invention is to provide a log-skinning machine which will remove the bark cleanly from logs by constant pressure of bark-removing-tool means on the logs regardless of the form, shape and diameter of the logs.

A further important object of the present invention is to provide a rotary skinner assembly through which logs are axially passed and which carries skinning tools that are automatically maintained under constant pressure and automatically adjust themselves to the incoming logs to receive the logs and move between the bark and the wood in stripping the bark from the wood as the logs are moved axially and the skinner assembly is rotated around the logs. Generally, stated, the skinner assembly includes an annular closed reservoir or tank for air, gas or other fluid pressure medium, which is rotated by a drive means and has a large center opening for the axial passage therethrough of the logs. The tools extend radially inwardly from the doughnut-shaped tank, within the passage, and are pivotally carried thereby. Each tool is provided with a control means that is in communication with and responsive to the fluid pressure in the reservoir so that each tool is constantly and individually maintained under fluid pressure. The pressure, acting on the tools, maintains the tools in a closed position toward the center of the passage so that they are disposed within the path of movement of an incoming log which abuts the tools to spread them apart. The tools are moved radially outwardly, against the constant fluid pressure, because of their shape, by the force of the axial movement of the log and permit the log to pass therebetween and then are maintained on the log by the constant pressure. As the tank is rotated, the tools are carried around the axially moving log to skin the bark therefrom. Since each tool is separately and individually maintained under a constant pressure, each tool will automatically adjust itself to the log, so that the diameter, surface condition or shape of the log are immaterial and the log will be efficiently and cleanly skinned regardless of such factors. The variance of such factors in various logs is unimportant in the operation of the machine.

A further important object of this invention is to provide a tool unit which includes an askew-angle-shaped skinning arm that is pivoted at one end to the inner periphery of the annular tank, and is provided at its other or free end with a cutting bead that is welded thereon and is easily replaceable. The cutting bead is the only part that normally requires replacement and a new bead can be easily and inexpensively welded on so that the upkeep and replacement of the tool units is a fraction of the upkeep of the present debarking tools. The arm is formed at any desired askew angle in relationship to the center of the passage through the tank so that each arm is moved out by an incoming log and moves over and onto the log under the infeed force of the log and its own rotary motion.

Another important object of the present invention is to provide means for raising and lowering the rotary skinner assembly in relation to longitudinally aligned infeed and outfeed assemblies disposed at opposite sides of the passage through the skinner assembly so that each log may be easily and rapidly centered in the skinner assembly.

A still further important object of the present invention is to provide separately powered and controlled infeed and outfeed units which move the logs axially and which are driven at controlled speeds and which include novelly constructed rollers that move the logs axially while constantly retaining them in centered positions relative to the passage in the rotary skinner assembly.

The foregoing and ancillary objects, including the provision of a compact, inexpensive and easily operated skinning machine, are attained by this invention, the preferred embodiment of which is set forth in the following description and illustrated in the accompanying drawings, wherein:

Fig. 7 is a detailed, fragmentary perspective view of one of the tool means and showing the mounting arrangement therefor; and, Fig. 8 is a detailed vertical sectional view, taken on line 8—8 of Fig. 7.

Referring now more particularly to the accompanying drawings, the log-skinning machine 10 includes a skinner assembly 12 to which logs are fed by an infeed unit 14 and from which skinned logs are removed by an outfeed unit 16. The skinner assembly is located between the feed units and the assembly and units are supported by a framework 18.

The framework 18 includes opposing pairs of end legs 20 and 22 between which upper and lower sets 24 and 26 of longitudinally extending, transversely spaced side bars extend. The sets of side bars are reinforced by suitable bracing. The frame 28 for the skinner assembly is interposed between and connected to the side bars for the infeed and outfeed units.

The infeed unit includes a plurality of powered bottom rollers 30 and a pair of hold-down rollers 32 on top. Similarly, the outfeed unit is composed of bottom powered or driven rollers 34 and upper hold-down rollers 36. The bottom rollers 30 and 34 are rotatably journaled transversely between the opposing side bars of the bottom set 26 and are arranged in longitudinally spaced fashion. The rollers 30 and 34 include shafts 38 which are rotatably journaled in bearing blocks 40 mounted on the side bars of the bottom bars 26. End plates 42 and 44 are fixed on the shafts in axially spaced fashion thereon and are located between the side bars. V-shaped bars 46 extend between the end plates and have their apices fitted on the shafts so as to provide the concave hub for the rollers. The bars 46 are arranged sidewise relative to the logs which are cradled thereby.

Figure 3:
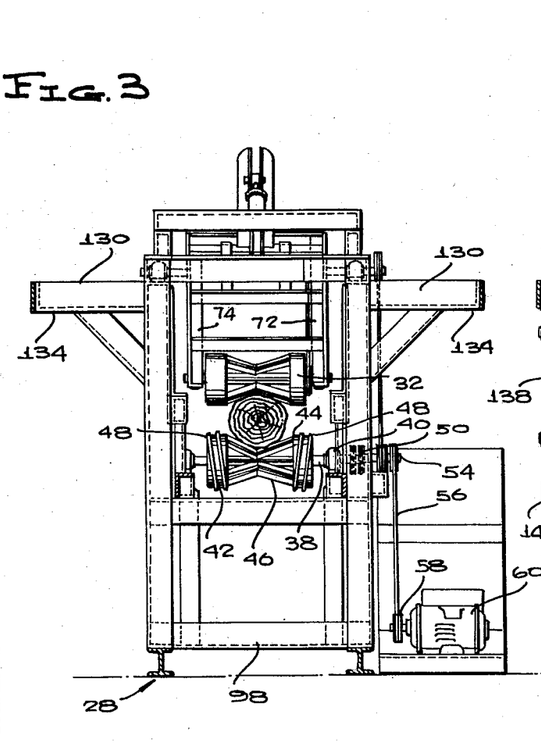
Fig. 3 is a transverse, vertical sectional view, taken on line 3—3 of Fig. 2.
Figure 4:
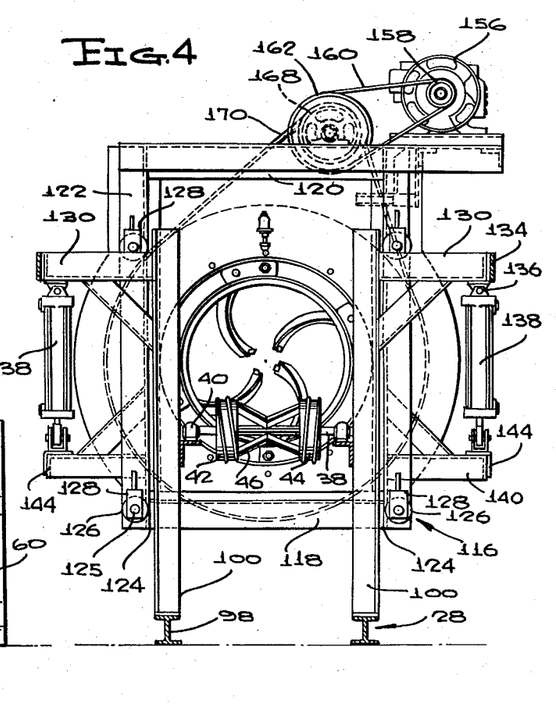
Fig. 4 is a transverse, vertical sectional view, taken on line 4—4 of Fig. 2.

The end plates 42 and 44 of the rollers are formed on their peripheral surfaces with spirally arranged ribs 48 that serve to center the logs, at all times, on the hubs of the rollers and prevent the logs from riding over onto the end plates. It is to be noted, as shown in Figs. 3 and 4, that the ribs on the opposing end plates are oppositely spiralled so that they push the logs back onto the hubs if the logs try to ride over the end plates off of the hubs.

The shafts 38 for the rollers 30 of the infeed unit have their ends projecting beyond one of the side bars and sprockets 50 are fixed on the extending ends and are interconnected by an endless drive chain 52. One of the shafts is provided with an additional pulley or sprocket means 54 that receives a drive chain 56 which is powered by a drive sprocket 58 on the shaft of a reversible electric motor 60. The motor 60 is mounted on a suitable subframe structure 62 which may provide a support for a control panel and operator's station 64.

The shafts 38 for the rollers 34 are drivingly interconnected by a chain 66 and are driven by a drive chain 68 from a reversible electric motor 70 that is suitably supported at the inner end of the outfeed unit.

The motors 60 and 70 may be separately controlled or they can be synchronized for forward or reverse movement. The rate of lineal-feet movement of the logs per minute can be varied by an operator who controls the motors 60 and 70 by suitable push button controls on the control panel.

The upper hold-down rollers 32 of the infeed unit are similar in construction to the rollers 30 but the end plates are formed without the ribs. The rollers 32 are rotatably journaled between the lower ends of a pair of arms 72 and 74 which are fixed at their upper ends on a rod 76 that is rotatably journaled in pillow blocks 78 on the upper set of side bars. The arms are suitably braced. The arms hang down from the upper side bars and support the rollers 32 at their lower ends so that the rollers bear on the logs to hold the logs down on the bottom rollers. Certain of the upper rollers, for example, the roller 32a is powered by a chain transmission means 80 from one of the shafts 38 for one of the bottom rollers. The other rollers may idle or may also be driven in a similar fashion.

The powered roller 32a is provided with a hydraulic hold-down means while the idler rollers bear, by gravity and the weight of their supporting arms, on the logs. The hydraulic hold-down means includes a hydraulic cylinder 82 which is mounted, at its closed end, on a support 84 that is mounted transversely on the side bars of the upper set 24. The piston rod 86 of the cylinder is pivotally connected to an upright bar 88 which is fixed by a transverse angle iron 90 to the upper ends of the arms 72 and 74. Inlet and outlet hydraulic lines 92 extend from the cylinder to a supply means 94 and the flow of hydraulic fluid through the lines is controlled by valve means operated from the control panel.

The upper hold-down rollers 36 for the outfeed unit are formed, arranged and mounted similar to the rollers 32 and one of the rollers 36a is powered and is held down by a hydraulic cylinder arrangement 96 similar to that described in connection with the roller 32a. The hydraulic cylinder of the arrangement 96 is actuated by hydraulic pressure from the source 94 through hoses 98 and is controlled separately from the cylinder 82.

The arms 72 and 74, which form a swinging frame for the rollers 32 and 36, slope downwardly, in the case of the rollers 32 toward the skinner assembly 12 and in the case of the rollers 36 away from the skinner assembly and, either by weight and gravity or by positive hydraulic means, hold the rollers 32 and 36 in contact with the logs so that the rollers hold the logs down on the rollers 30 and 34 to ensure a positive, nonslipping axial feed of the logs regardless of the shape, diameter or surface condition thereof.

The skinner assembly 12 includes the fixed frame 28 which comprises a base 98 from which supporting standards 100 upstand. Suitable cross braces 102 are provided and the standards are suitably secured to the inner ends of the upper and the lower sets of side bars 24 and 26.

Figure 6:
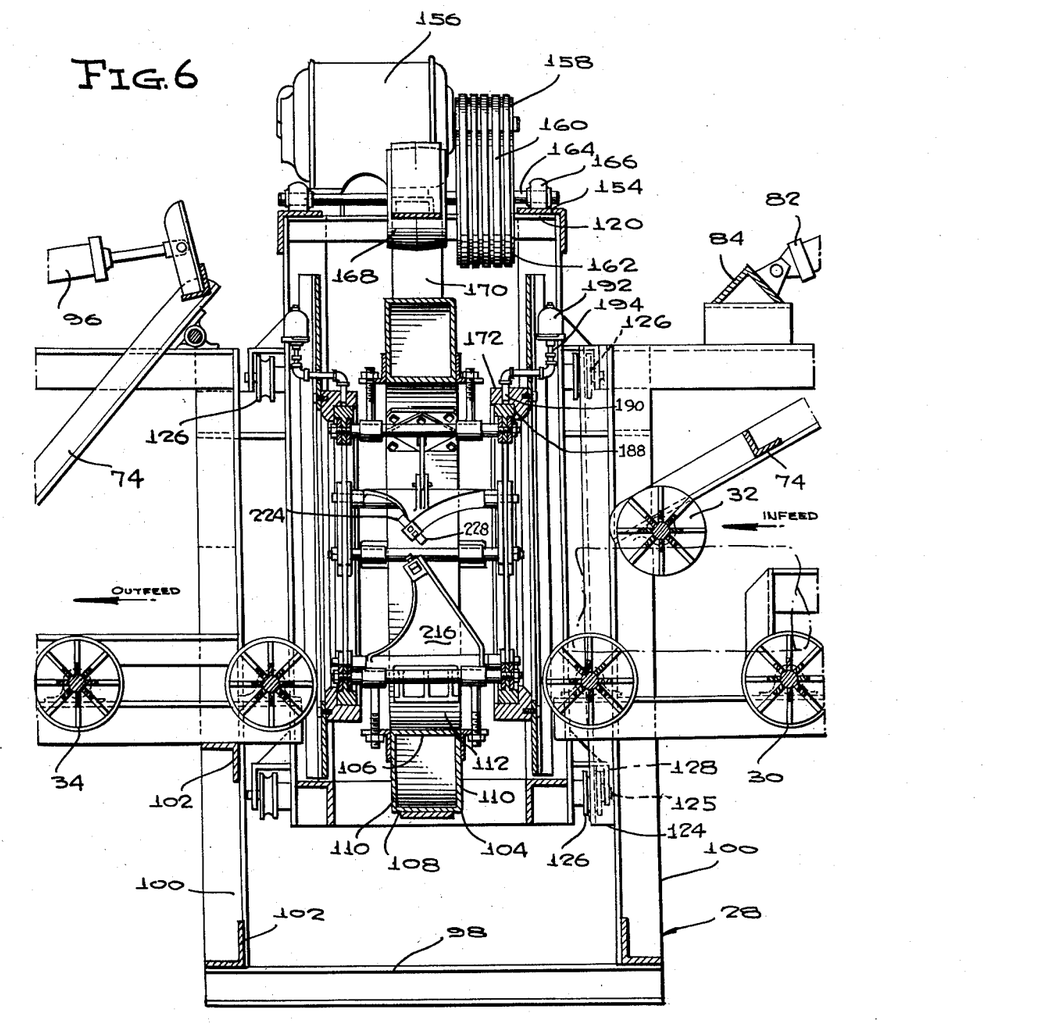
Fig. 6 is a detailed, longitudinal vertical sectional view, taken on line 6—6 of Fig. 5.

An annular or doughnut-shaped ring or tank 104 forms a closed reservoir for a fluid pressure medium, such as, compressed air, gas, steam or the like, and is disposed transversely of the passage defined by the infeed and outfeed units and is positioned within the frame 28 and supported in a manner to be described. The annular tank 104, as shown in Fig. 6, has concentric inner and outer peripheral walls 106 and 108 and opposing side walls 110. The inner wall 106 defines a passage 112 which is alignable with the passageways defined by the rollers of the feed units to receive a log.

An annular protective casing or housing 114 surrounds the tank with the passage 112 being left open, the housing being shaped to the contour of the ring tank and being spaced therefrom and being formed from suitable metal sections so as to be easily removable. The housing is supported by a heavy, welded steel frame 116 which includes a rectangular, open bottom framework 118 and a similar upper framework 120, the frameworks being connected in vertically spaced relation by corner posts 122.

Figure 1:
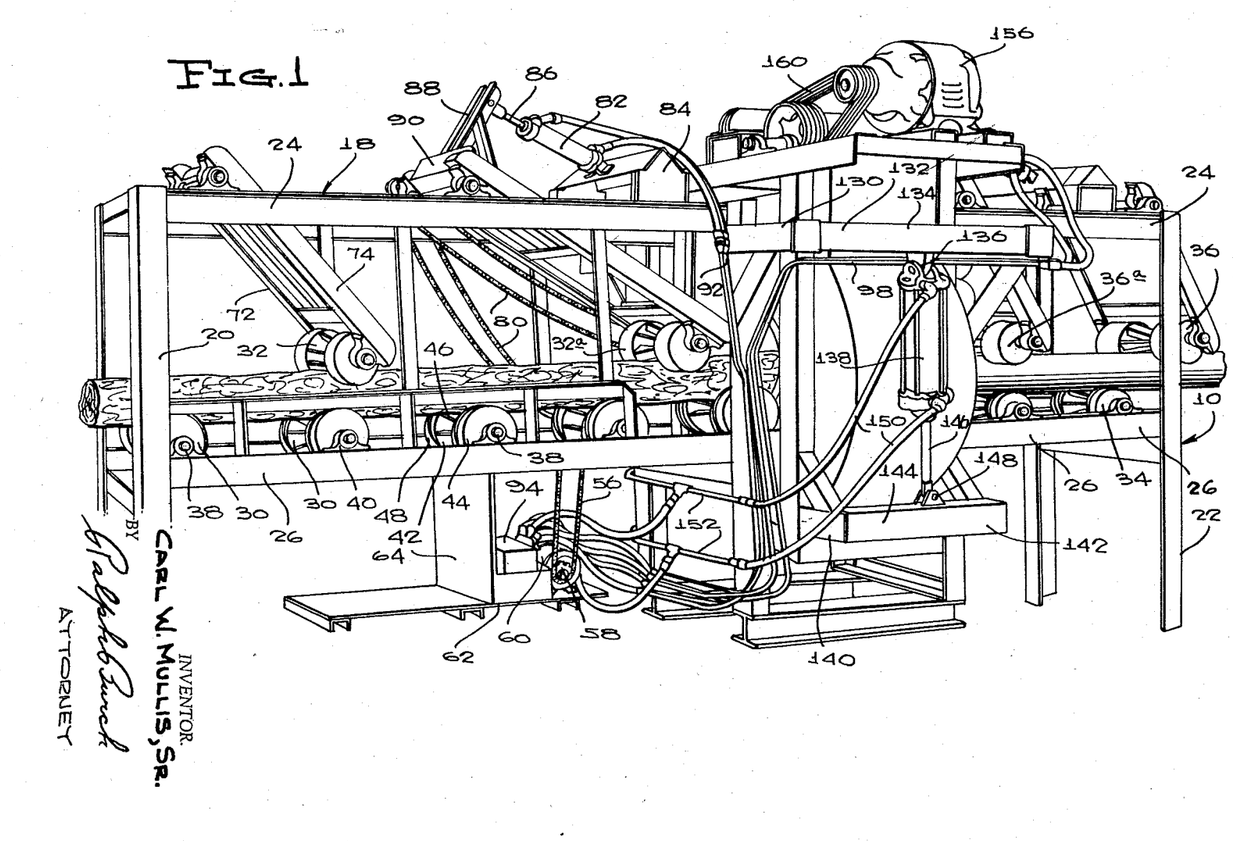
Fig. 1 is a side perspective view of the log-skinning machine of this invention.
Figure 2:
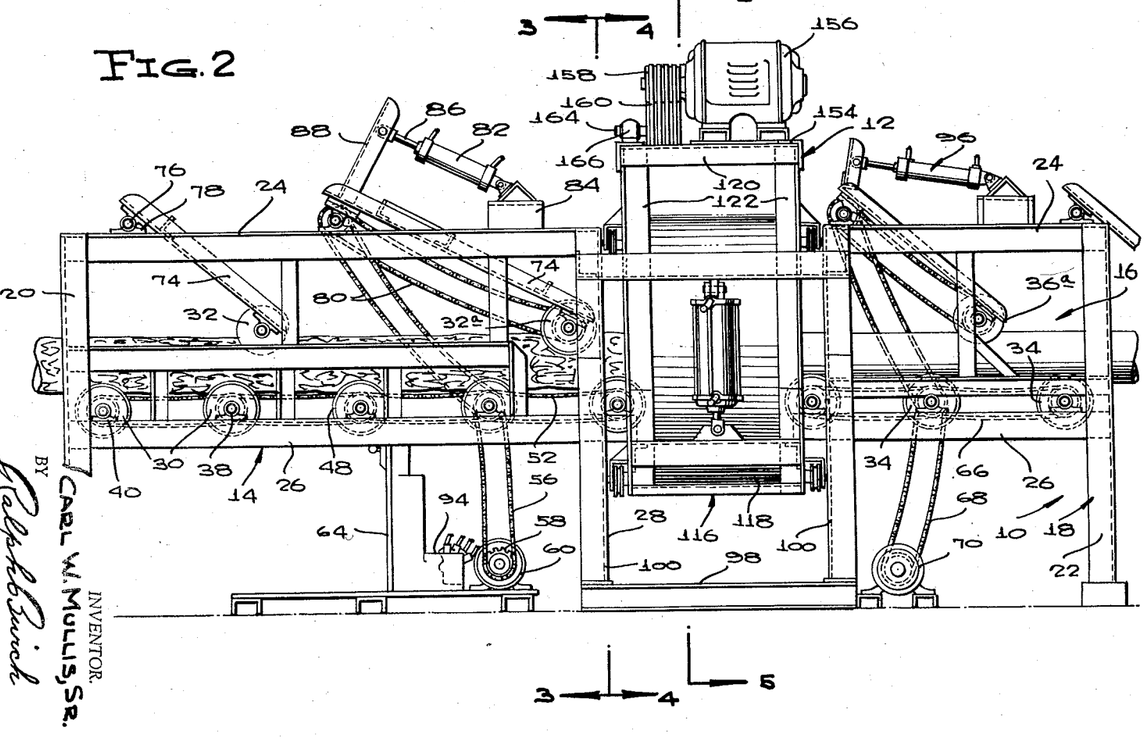
Fig. 2 is a side elevation thereof.

The frame 116 is vertically disposed between the longitudinally spaced pairs of transversely aligned standards and the posts 122 are disposed laterally outwardly of the standards 100 and adjacent thereto. The standards have tracks 124 formed vertically on their outer side faces. Rollers 126 are rotatably journalled on shafts 125 mounted horizontally in housings 128 which are secured to the outer side faces of the posts 122, as shown in Figs. 2 and 4, and the rollers ride on the tracks 124 to guide the frame 116 in its vertical movements. The rollers guide and stabilize the frame for vertical movement.

Adjacent their upper ends, the standards 100 have laterally outstanding arms 130 which are connected at their outer ends by a cross bar 132. The arms 130 and the cross bar provide horizontal supports 134 on each side of the frame 28 and, by means of a depending ear 136 on the cross bars, a hydraulic cylinder 138 is pivoted at its closed end to each horizontal support 134. The lower ends of the posts 122 have laterally outstanding arms 140 which are connected by cross bars 142 to provide horizontal supports 144 which underlie the supports 134. The outer ends of the piston rods 146 of the cylinders 138 are pivoted by ears 148 to the cross bars 142. Hydraulic inlet and outlet lines 150 extend from the cylinders, through suitable pipe connections 152, to the source 94 and suitable control valves are provided and are preferably mounted on the control panel 64.

By means of such hydraulic cylinder arrangement and the guide means between the fixed frame 28 and the movable frame 116, the frame 116, which carries the skinner means, can be easily raised and lowered to permit rapid centering of each log in the skinner means.

A platform 154 is mounted on the upper framework 120 and supports an electric motor 156, the operation of which is controlled by suitable controls on the control panel 64. A multiple sheave 158 is fixed on the armature shaft of the motor and is connected by a bank of belts 160 to a multiple sheave 162 which is fixed on a shaft 164. The shaft 164 is journalled on the platform by means of bearings 166 and is arranged longitudinally of the skinner machine. A large single flat pulley 168 is fixedly circumposed on the shaft 164 and carries a large flat belt 170 which is fitted around the outer peripheral wall 108 of the annular tank to rotate the tank, as will be described.

Disposed on each side of the rotatable tank 104 and spaced longitudinally of the skinner machine are stationary, annularly shaped cast-iron bearings 172 and 174 which are right angular in cross section. The circular or annular body portions 176 of the bearing races or rings are fastened by fasteners 178, in suitable manner, to the housing 114 and the frame 116. The bearing rings have inwardly extending radial flanges 180 on their outer edges. T-shaped rings 182 are rotatably mounted in the bearing rings with their head portions riding on the inner faces of the rings and the flanges. The radial flanges 184 of the rings extend inwardly and support a supporting means 186 for the tank so that the tank is attached to and supported for rotation by the rings 182 which rotate in the bearings and provide a rotating reel assembly.

The inner faces of the body portions 176 of the bearing rings are each formed with an annular lubricating groove 188 and the upper portion of each ring is formed with a bore 190 in communication with the grooves. Lubrication is supplied by a high pressure transmission lubricant which flows from a lubricating cup 192 mounted on the front and rear faces of the housing 114 through a pipe connection 194 to the bores.

The supporting means 186 includes a plurality of shafts 196 which extend transversely between and connect the flanges 184 of the rings 182. The ends of the shafts 196 are threaded and pass through openings in the flanges. Links 198 reinforce the flanges and nuts 200 secure the shafts to the flanges so as to space the rings axially and connect them together to form the reel assembly. The shafts are circumferentially spaced around the rings 182 and each shaft supports a pair of sleeves 202 which are spaced axially of the shafts. The sleeves 202 have rods 204 welded thereto at one of their ends. The opposing threaded ends of the rods 204 extend through openings in the laterally extending flanges 206 of angular brackets 208 which are secured to the sides 110 of the tank 104. Stay nuts 210 are threaded on the ends of the rods to fasten the brackets onto the rods and thereby attach the tank to the rotating reel assembly.

Pins 212 are fitted in aligned openings 214 in the opposing flanges 184 of the rings 182, such openings being formed through the reinforcing links 198. The pins extend through the center passage in the tank 104 and are disposed across the inner peripheral face 106 of the tank and extend longitudinally of the skinner machine. Askew-shaped skinner arms 216 are mounted on the pins 212 which act as pivots for the skinner arms. The skinner arms are triangularly shaped and have sleeves 218 formed on their major ends, the sleeves being rotatably circumposed on the pins. The arms extend radially inwardly from the peripheral face 106 of the tank and are spaced circumferentially thereof so as to converge with their minor ends 220 adjacent the center of the passage 112, as shown in Fig. 4. The minor ends 220 of the arms are formed with slots 222, arranged substantially at right angles to the pivot axis of the arms. A tool 224 is set in each slot and locked therein by bolts 226. A skinning bead 228 is welded on the end of each tool and is adapted to move between the bark and the wood in skinning the bark from the wood. The skinning bead is the only part of the tool means, which includes the skinner arms, that normally requires replacement. A new bead can be easily and inexpensively welded on so that the upkeep and maintenance of the tool means is a minimum one.

The skinner arms pivot about the pins 212 with the minor ends 220 swinging in toward the center of the passage 112. Each arm is identically formed with the askew angle being an angle of less than 90° in relationship to the center of the reel assembly and the annular tank.

Each arm is constructed in an arc with the radius in relationship to the size of the passage 112 or size of the opening in the reel assembly, such radius to be made to compensate for the compound angle that is formed by the construction of the arm running from the outside point of the reel assembly at the pivot point to a desired point at any given distance from the center of the width of the reel assembly, thus forming an askew angle to the center of the reel assembly.

The tools 224 are preferably set at a 90° angle to the outside askew angle of the arm. The tools are made up from hot rolled steel or any other stock with a compound angle formed on the end of each tool in relationship to a line drawn through the center of the reel assembly.

The reel assembly and the tank are rotated by the belt 170 with the askew angle of the skinner arms pointing from the pivot point to the center at an askew angle from the direction of rotation, thus providing a yielding action to knots or other obstructions encountered in the path of rotation.

The major ends of the skinner arms are provided with counterweights 230 that are disposed radially outwardly of the pins 212 and swing about the pivot points radially outwardly thereof.

Means is provided for maintaining the skinner arms under constant fluid pressure and such means includes a connection between the interior of the tank 104 and each skinner arm.

Figure 5:
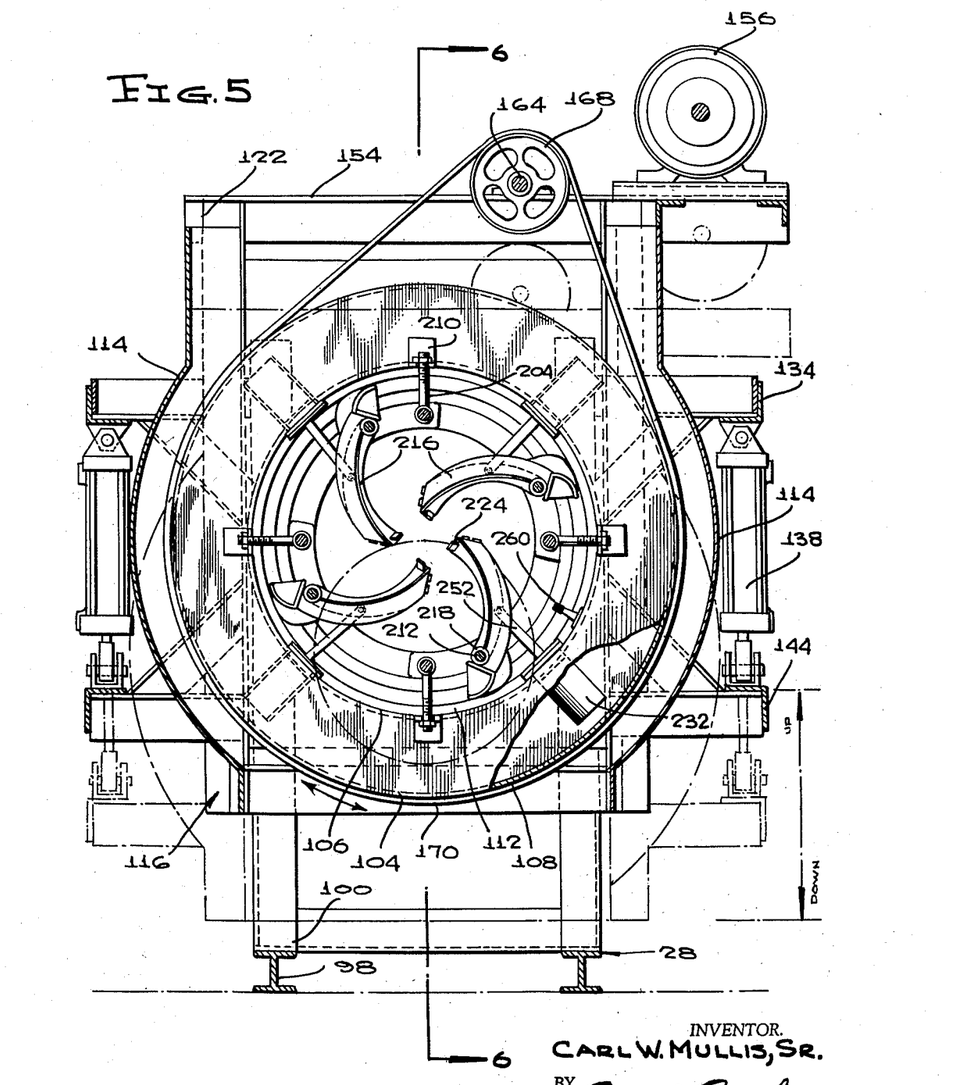
Fig. 5 is an enlarged cross-sectional view taken on line 5—5 of Fig. 2.
Figures 7, 8:
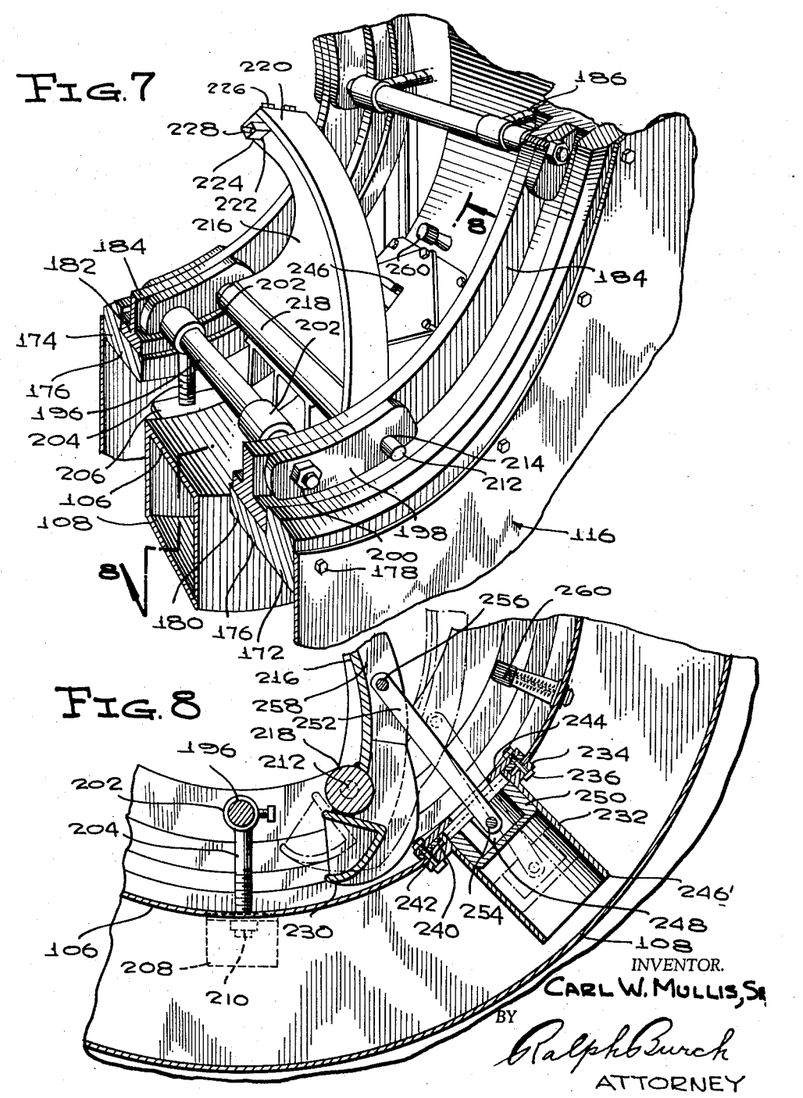

As shown in Figs. 5 and 8, such means includes a plurality of open-ended cylinders 232, which are attached to the inner peripheral wall 106 of the tank and disposed in circumferentially spaced fashion within the tank, a cylinder being provided for each skinner arm. Each of the cylinders 232 is provided, adjacent its inner end, with a mounting flange 234, which is secured by bolt fasteners 236 to the inside of the peripheral wall 106 of the tank. The inner ends of the cylinders extend through openings 240 formed in the wall 106. Spacers 242 surround the inner ends and receive the bolt fasteners, with closure plates 244 being provided to close off the inner ends of the cylinders. The closure plates are formed with slots 246. The cylinders extend radially from the wall 106 and have their outer open ends 246' spaced from the outer wall 108. Thus, the fluid pressure from the tank is freely admitted to the cylinders. Pistons 248 are mounted for reciprocatory movement in the cylinders and are provided with packing cups 250, which may be formed from leather or synthetic materials and which prevent the fluid pressure from the tank reservoir from escaping as the tool means open and close during the process of skinning the bark from the logs. In this respect, connecting links 252 are pivoted, as at 254, to the pistons and extend through the slots 246 in the face plates 244. The outer ends of the connecting links are pivoted on pins 256, which are secured to the side flanges 258 on the skinner arms, as shown in Fig. 8.

A valve 260 is mounted on the inner wall 106 of the annular tank and provides the means whereby the supply of the fluid pressure medium in the tank may be replenished.

It is to be particularly noted that the skinning arms are designed and formed in the askew angle shape so that they will be automatically opened by the infeed force of the logs and the rotary action imparted to the arms and to the tools by the rotation of the annular tank. The skinner arms, by virtue of the piston and link connection between the arms and the pressure in the tank, are maintained under constant pressure regardless of changing log diameters and the surface conditions of the logs. The packing cups 250 on the pistons prevent the fluid pressure medium from escaping from the tank reservoir as the arms open and close during the process of receiving incoming logs and skinning the bark therefrom. The arms are always maintained at the center of the passage 112 through the annular tank until an incoming log forces the arms apart and spreads them radially outwardly, due to the askew angle action of the end of the incoming logs. The tank reservoir can be filled to any desired pressure and the pressure on the pistons 248 is always constant and is never exhausted, with the possible exception of the small seepage past the packing cups. If the pressure in the tank becomes too low for total bark removal, the tank can be refilled by means of the valve 260. In this respect, one fluid pressure medium which has proved extremely workable is compressed air and an operator can easily refill the pressure tank by means of an ordinary air compressor.

In operation, a log is placed in the infeed unit and is moved axially forward toward the center skinner assembly. The rate of speed through the debarker can be controlled and varied by the operator by means of controls on the control panel 64, which controls control the motor 58. The annular tank is rotated by the motor 156, which drives the belt 170 and the skinner arms are revolved by the tank. As the end of the log abuts the arms, the arms are spread outwardly to receive the log, due to the askew-angle shape of the arms and the revolving motion thereof. The skinning beads move between the bark and the wood and the combination of the revolving motion of the arms and the axial movement of the log moves the beads over the entire log to skin the bark therefrom. The log is carried from the skinner assembly by the outfeed unit, the speed of which is controlled by the operator.

The skinner assembly can be raised and lowered by means of the hydraulic cylinders 138 so as to permit rapid centering of each log within the passage 112. Such centering of the log contributes to the effective removal of bark from logs of all diameters, shapes and sizes.

It is to be particularly noted that the skinner arms are constantly acted on by the fluid pressure medium in the tank, through the cylinder and piston connection between the interior of the tank and the skinner arms. The cylinders, while shown in attachment to the inner peripheral wall 106 of the tank, may be mounted on the sides of the tank with connections to the tank, or may be otherwise arranged and connected with relation to the interior of the tank.

Because of the construction of the cylinders and pistons and the arrangement of the packing cups, the compressed air from the annular tank reservoir is never exhausted, thereby affording a constant pressure of substantially equal velocity at any point of the piston travel.

While the preferred form of this invention has been shown and described herein, other forms may be realised as coming within the scope of the appended claims.

What is claimed is:

1. A log-skinning machine comprising a fixed supporting frame, an annular rotary reel assembly having a central passage for the axial movement of logs therethrough, means mounting the reel assembly in the frame for rotary movement, means for rotating the reel assembly, a plurality of askew-shaped arms pivotally mounted at one end to the reel assembly and extending radially inwardly therefrom into the passage and arranged in circumferentially spaced relation, bark-removing elements provided on the inner ends of the arms, a reservoir for fluid under pressure carried by the reel assembly, and means connected between the reservoir and the arms to maintain the arms under continuous constant pressure, said reservoir being in the form of an annular tank having a central passage for the logs and said arms being arranged within the tank passage and extending radially inwardly from the tank, and said means connected between the reservoir and the arms including open-ended cylinders fitted in the inner peripheral wall of the tank and arranged radially thereof, pistons slidably disposed in said cylinders and connecting links pivotally connected to the pistons and to the arms intermediate the inner and outer ends of the arms.

2. In a material-treating apparatus, an annular tank defining a reservoir for a fluid under pressure and having a central passage for the axial movement of material through the tank, means mounting the tank for rotary movement about the material, tool means pivotally carried by the tank and extending radially inwardly toward the center of the passage for acting on the material, means operatively connected between the tank and the tool means and constantly responsive to the fluid pressure in the tank for maintaining the tool means under continuous, constant pressure, and means for rotating the tank and the tool means about the material so that the tool means under pressure act on the material as the material passes through the passage in the tank, said means connected between the tank and the tool means including cylinders arranged radially of the tank and carried thereby, said cylinders being in free communication with the interior of the tank, pistons workably mounted in the cylinders, and connecting links pivotally connected between the pistons and the tool means.

3. A log-skinning machine comprising a framework, said framework including an intermediate section, a movable frame slidably mounted for vertical movement on said section, hydraulic means for vertically moving said movable frame, a rotary reel assembly, means rotatably mounting said assembly in the frame, said assembly having a passage for an axially fed log, a plurality of skinner arms pivotally carried by the reel assembly, and radially extending inwardly therefrom toward the center of the passage, said skinner arms having bark-removing elements provided on their inner ends for skinning the bark from the wood of the logs, means carried by the frame and connected to the reel assembly for rotating the reel assembly and the arms about a log moved axially through the passage, a reservoir for a fluid pressure medium carried by the reel assembly, and means in communication with the reservoir and responsive to the fluid pressure therein and operatively connected to the arms for maintaining the arms under continuous, constant pressure, said reservoir being in the form of an annular tank having a central passage aligned with the passage in the reel assembly, said reel assembly including a pair of spaced rings, rods transversely extending between and connecting said rings, sleeves circumposed on said rods, bolt elements carried by said sleeves, and means attaching said bolt elements to the annular tank for mounting the tank on the reel assembly.

4. A log-skinning machine comprising a framework, said framework including an intermediate section, a movable frame slidably mounted for vertical movement on said section, hydraulic means for vertically moving said movable frame, a rotary reel assembly, means rotatably mounting said assembly in the frame, said assembly having a passage for an axially fed log, a plurality of skinner arms pivotally carried by the reel assembly, and radially extending inwardly therefrom toward the center of the passage, said skinner arms having bark-removing elements provided on their inner ends for skinning the bark from the wood of the logs, means carried by the frame and connected to the reel assembly for rotating the reel assembly and the arms about a log moved axially through the passage, an annular tank for a fluid pressure medium surrounding the reel assembly and means in communication with the tank and responsive to the fluid pressure therein and operatively connected to the arms for maintaining the arms under continuous, constant pressure, said arms being substantially triangular and having major and minor ends, said major ends having transverse sleeves provided thereon, rods forming a part of the reel assembly and on which the sleeves are rotatably disposed to pivot the arms to the reel assembly, said arms being askew shaped from their major to their minor ends.

5. In a log-skinning machine, an annular tank containing a fluid under pressure having a central passage for the axial movement of logs therethrough, bark-removing elements carried by said tank and extending radially inwardly toward the center of the passage, cylinders mounted in the inner peripheral wall of said tank in open communication with the interior of the tank, pistons slidably mounted in said cylinders having connection with said bark-removing elements, said pistons being operated by the fluid pressure in said tank to maintain said bark-removing elements under constant pressure, and means for rotating said tank.

6. In a log-skinning machine, an annular tank containing a fluid under pressure having a central passage for the axial movement of logs therethrough, a plurality of askew-shaped arms pivotally mounted within the central passage of said tank, bark-removing elements mounted on the inner ends of said arms, cylinders mounted in the inner perpiheral wall of said tank in open communication with the interior of the tank, pistons slidably mounted in said cylinders having connection with said arms, said pistons being operated by the fluid pressure in said tank to exert a constant pressure on said arms, and means for rotating said tank.

7. In a log-skinning machine, a rotary reel assembly having a central passage for the axial movement of logs therethrough, a plurality of askew-shaped arms pivotally mounted on said reel for movement towards the center of said passage, bark-removing elements mounted on the inner ends of said arms, an annular tank containing a fluid under pressure surrounding said reel and carried thereby, cylinders mounted in the inner peripheral wall of said tank having open communication with the interior of said tank, pistons slidable in said cylinders having connection with said arms, said pistons being operated by the fluid pressure in said tank to exert a constant pressure on said arms, and means for rotating said reel.

8. In a log-skinning machine, a rotary reel assembly having a central passage for the axial movement of logs therethrough, a plurality of askew-shaped arms pivotally mounted on said reel for movement towards the center of said passage, bark-removing elements mounted on the inner ends of said arms, an annular tank containing a fluid under pressure surrounding said reel and carried thereby, fluid pressure operated means mounted on the inner peripheral wall of said tank in communication with the interior of said tank, said means having connection with said arms to exert a constant pressure on the arms, and means for rotating said reel.

9. In a log-skinning machine as described in claim 8 wherein said last mentioned means includes a drive belt trained around the outer peripheral wall of said tank, and means for driving said belt.

10. In a log-skinning machine, an annular tank containing a fluid under pressure having a central passage for the axial movement of logs therethrough, a plurality of askew-shaped arms pivotally mounted within the central passage of said tank having slots in their inner ends at substantially right angles to the pivot axis of said arms, a tool mounted in the slot of each arm having on its end a cylindrical bead for engagement with the log, fluid pressure operated means mounted on the inner peripheral wall of said tank in communication with the interior of said tank, said means having connection with said arms to exert a constant pressure on the arms, and means for rotating said tank.

References Cited in the file of this patent
UNITED STATES PATENTS

| | | |
|---|---|---|
| 2,591,751 | Whitlock | Apr. 8, 1952 |
| 2,749,952 | League | June 12, 1956 |
| 2,786,499 | Brundell et al. | Mar. 26, 1957 |
| 2,798,519 | Hansel | July 9, 1957 |
| 2,802,495 | Nicholson | Aug. 13, 1957 |
| 2,821,220 | Nicholson | Jan. 28, 1958 |

FOREIGN PATENTS

| | | |
|---|---|---|
| 67,469 | Sweden | June 4, 1929 |